United States Patent
Phelan et al.

(10) Patent No.: US 7,831,761 B2
(45) Date of Patent: Nov. 9, 2010

(54) MULTIPLE MULTIPATHING SOFTWARE MODULES ON A COMPUTER SYSTEM

(75) Inventors: Thomas A. Phelan, San Carlos, CA (US); Olivier Lecomte, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/265,548

(22) Filed: Nov. 5, 2008

(65) Prior Publication Data

US 2009/0119685 A1  May 7, 2009

Related U.S. Application Data

(60) Provisional application No. 61/002,348, filed on Nov. 7, 2007.

(51) Int. Cl.
*G06F 13/00* (2006.01)
*G06F 13/28* (2006.01)

(52) U.S. Cl. ............................ 711/100; 719/321; 710/38

(58) Field of Classification Search .................. 719/321; 710/38, 22; 711/100, 1; 709/223
See application file for complete search history.

(56) References Cited

U.S. PATENT DOCUMENTS 6,904,477 B2 * 6/2005 Padmanabhan et al. ....... 710/74
7,272,674 B1 * 9/2007 Nandi et al. .................. 710/38
7,447,939 B1 * 11/2008 Faulkner et al. ................ 714/8
7,620,774 B1 * 11/2009 Waxman ...................... 711/114
2006/0112219 A1 * 5/2006 Chawla et al. ............... 711/114

OTHER PUBLICATIONS

Barnett, Multi-path I/O for AIX 5L Version 5.2, IBM, Oct. 11, 2002, pp. 1-13.*
Goggin et al, Linux Multipathing, Proceedings of the Linux Symposium, Jul. 2005, pp. 147-167.*
Michael et al, Conifguring Linux to Enable Multipath I/O, Dell Power Solutions, Aug. 2006, pp. 108-112.*
Online pub: "Configuring Linux to Enable Multipath I/O;" Aug. 6; T. Michael et. al.

* cited by examiner

*Primary Examiner*—Diem K Cao

(57) ABSTRACT

One embodiment of the present invention is a method for enabling a computer system to run multiple multipathing software modules which includes: (a) scanning for physical devices; (b) scanning for paths to each of the physical devices; (c) presenting the paths to one or more multipathing software modules of a plurality of multipathing software modules operating within the computer system; (d) the multipathing software modules claiming or rejecting one or more of the one or more paths; and (e) creating and exposing one or more logical devices, wherein each logical device is associated with a multipathing software module.

14 Claims, 2 Drawing Sheets

MULTIPLE MULTIPATHING SOFTWARE MODULES ON A COMPUTER SYSTEM

This application claims the benefit of U.S. Provisional Application No. 61/002,348 filed Nov. 7, 2007, which provisional application is incorporated herein by reference in its entirety.

BACKGROUND

Currently a server can be connected to different storage media. Furthermore, the server can include multiple physical paths from the server to each of the different storage media. In this manner, if one of those physical paths should fail, data traffic can be routed to or from a storage media via one or more of the other physical paths. Typically, this routing is performed by multipathing software operating on the server.

Usually, a specific version of multipathing software is installed on a server which is developed and tailored to provide a variety of functionality for its corresponding storage media. However, if the server is connected to storage media that does not correspond to the multipathing software of the server, the multipathing software typically provides limited functionality to that non-corresponding storage media.

SUMMARY

One embodiment of the present invention is a method for enabling a computer system to run multiple multipathing software modules which comprises: (a) scanning for physical devices; (b) scanning for paths to each of the physical devices; (c) presenting the paths to one or more multipathing software modules of a plurality of multipathing software modules operating within the computer system; (d) the multipathing software modules claiming or rejecting one or more of the one or more paths; and (e) creating and exposing one or more logical devices, wherein each logical device is associated with a multipathing software module.

DETAILED DESCRIPTION

Figure 1:
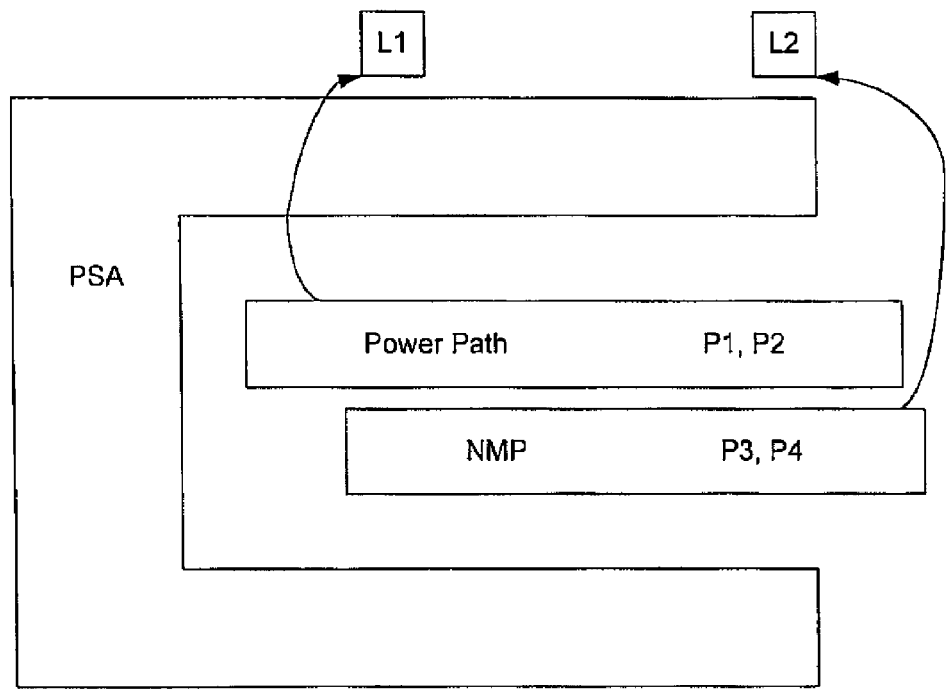
FIG. 1 is a block diagram showing simultaneous use of multiple multipathing software modules according to an embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the claims. Furthermore, in the following detailed description of various embodiments in accordance with the invention, numerous specific details are set forth in order to provide a thorough understanding of the invention. However, it will be evident to one of ordinary skill in the art that one or more embodiments of the invention may be practiced without these specific details. In other instances, well known methods, procedures, components, and circuits have not been described in detail as not to unnecessarily obscure aspects of the invention.

Unless specifically stated otherwise as apparent from the following discussions, it is appreciated that throughout the present detailed description, discussions utilizing terms such as "presenting", "claiming", "rejecting", "discovering", "disabling", "performing", "translating", "setting", "programming", "utilizing", "incorporating", "producing", "retrieving", "outputting", or the like, can refer to the actions and processes of a computer system or electronic computing device, but is not limited to such. The computer system or electronic computing device can manipulate and transform data represented as physical (electronic) quantities within the computer system's registers and/or memories into other data similarly represented as physical quantities within the computer system memories and/or registers or other such information storage, transmission, or display devices. Some embodiments of the invention are also well suited to the use of other computer systems such as, for example, optical and virtual computers.

One or more embodiments of the present invention can include a mechanism and/or method for enabling a computer system, and more particularly, an operating system, to run multiple multipathing software modules simultaneously. As is well known, multipathing software enables more than one physical path to be established between a hardware system (for example, a computer, a server, etc.) and its mass storage devices (or storage media) through buses, controllers, switches, and/or bridge devices. The redundant paths can be used to provide fault tolerance, dynamic load balancing, and/or traffic shaping. In accordance with one or more such embodiments, different multipathing software (or multipathing software modules) from different vendors are enabled to operate simultaneously within a single operating system, thereby leveraging the capabilities/functionalities available from different multipathing software (for example, and without limitation, a PowerPath™ multipathing module from EMC Corporation (EMC) and a Smart Array Multipath multipathing module from Hewlett-Packard Company (HP) could run simultaneously).

FIG. 1 is a block diagram of exemplary architecture (or system) 1300 that is fabricated in accordance with one or more embodiments of the invention. In accordance with one or more such embodiments, system 1300 is a virtualized computer system, and as such, system 1300 can include one or more virtual machines (VMs) VM1 and VM 2 that can be operating on a hardware system (for example, a computer, a server, etc.). Virtualization technology is well known to those of ordinary skill in the art, and advantages of virtual machine technology have become widely recognized. Among these advantages is an ability to run multiple virtual machines on a single host platform. As is well known in the field of computer science, a VM is an abstraction—a "virtualization"—of an actual physical computer system. In one possible arrangement of a computer system that implements virtualization, one or more VMs are installed on a "host platform," or simply "host," which will include system hardware, and one or more layers or co-resident components comprising system-level software, such as an operating system or similar kernel, or a virtual machine monitor or hypervisor (see below), or some combination of these. The system hardware typically includes one or more processors, memory, some form of mass storage, and various other devices.

As shown in FIG. 1, system 1300 includes a virtual machine kernel (VMKernel), sometimes referred to as a hypervisor, that operates on the hardware system, which VMKernel is not part of any VM in system 1300. As further shown in FIG. 1, the VMKernel includes a component referred to herein as a Pluggable Storage Architecture (PSA)

which includes a series of APIs that are used to write a multipathing software module. In accordance with one or more such embodiments of the present invention, the PSA includes a Native Multipathing (NMP) multipathing software module and a PowerPath multipathing software module and, using the PSA, for example, the PowerPath multipathing software module and the NMP multipathing software module are able to operate simultaneously while operating within a single operating system (e.g., VMKernel).

In accordance with one or more embodiments, the PSA implements a path discovery process and a storage plugin path claiming process. For example, in accordance with one or more such embodiments, the path discovery process includes the PSA scanning the storage devices. In accordance with one or more such embodiments, the path scanning process includes a new path discovery process and a removal of missing paths process, for example, create, keep, and destroy paths.

During path scanning, physical paths can end up in a group of unclaimed paths. In accordance with one or more embodiments, a storage plugin path claiming process includes the PSA sending a "start of path claiming" notification to all plugins (or multipathing software modules). Additionally, the PSA presents the paths to the plugins (or multipathing software modules) based on inquiry data and configuration file rules. In accordance with one or more such embodiments, a plugin (or multipathing software module) can claim or reject the path. In addition, the storage plugin path claiming process also includes the PSA sending an "end of path claiming" notification to all plugins (or multipathing software modules). Note that, since a plugin (or multipathing software module) has all the paths, it may create a logical device (for example and without limitation, a PSA entity that behaves like a SCSI device) and expose it to the PSA.

A sample configuration file would be:

| | |
|---|---|
| Model String "Disk Type A" | Plugin "mpmgmt#1" |
| Model String "Disk Type B" | Plugin "mpmgmt#2" |
| Model String "Disk Type C" | Plugin "mpmgmt#1,mpmgmt#2" |
| Model String "" | Plugin "vmware-nmp" |

Referring to FIG. 1, the PSA looks at all physical paths to a physical storage device (or media). A path refers to a single physical path through a storage network to a physical unit of storage—typically it refers to a path in a Fibre Channel or iSCSI (i.e., SCSI over IP) storage network. Specifically, as shown in FIG. 1, one or more device drivers (device driver 1 and device driver 2) exist beneath the VMKernel. For example, and without limitation, the device drivers can each be coupled to physical storage on an array via a fiber channel (FC) where the fiber channel can support multiple paths between each device driver and the physical storage.

In accordance with one such embodiment, multiple fiber channels can couple each device driver to the physical storage.

In accordance with one or more embodiments of the present invention, the VMKernel and the PSA probe all the device drivers and gather a collection of paths. The PSA uses a configuration mechanism and presents each of these physical paths to one or more of the multipathing software (e.g., PowerPath, NMP). In accordance with one or more such embodiments, a multipathing software module then has an option of claiming that path and taking ownership thereof. As such, a collection of physical paths (e.g., P1 and P2 shown inside PowerPath of FIG. 1) will be managed by the individual multipathing software module (e.g., PowerPath). The multipathing software module can then use a VMKernel API to call into the PSA, and export a logical device (e.g., L1). In accordance with one or more such embodiments, the logical device behaves in a manner similar to a physical device within any other operating system.

Note that, utilizing the technique of presenting physical paths to each multipathing software module operating on the VMKernel, the multiple multipathing software modules can operate in parallel. For example, the PowerPath multipathing software module could claim path 1 (P1) and path 2 (P2) while the NMP multipathing software module could claim path 3 (P3) and path 4 (P4). As such, each multipathing software module can export two different logical devices, for example, logical device 1 (L1) and logical device 2 (L2). The logical devices can be used in the operating system (e.g., VMKernel) to run virtual machines (VMs) located above those devices.

In accordance with one embodiment, multiple multipathing software modules may not share the same path. In accordance with such an embodiment, there will not be an overlap or conflict with regard to the same path. In such an embodiment, the PSA prevents (or stops) the occurrence of a shared path. For example, if the PSA detects four physical paths to the same piece of storage media, all of them can be claimed by one or another of the multipathing software modules. Note that multiple physical paths to the same LUN may not be shared among multiple multipathing software modules. For example in FIG. 1, if there were an IBM array located beneath the VMKernel that includes media on it, in one embodiment, paths to that IBM array are claimed by an IBM supplied multipathing software module. Also, if there were an EMC array located beneath the VMKernel that has some media on it, in the one embodiment, the paths to that EMC array are claimed by PowerPath. In accordance with one embodiment, it can be desirable to have the multipathing software module provided by each hardware vendor manage the physical paths to that hardware vendor's storage devices.

In accordance with one embodiment, path claiming can operate using a configuration file, which configuration file can include a series of rules—the rules can be in XML format, but are not limited to such. In accordance with one such embodiment, there is a utility that reads this information and loads it into the VMKernel. Then, an automated process in the VMKernel discovers the paths to the storage media. When it discovers a path, it issues an inquiry to the path. That inquiry returns information that specifies, for example, the vendor of the device, model of the device, and/or the version of the device. For example, the vendor might be EMC and the model might be Symm (for EMC Symmetrics). As such, the PSA can first present the path to the PowerPath multipathing software module (for example, to a path claiming entry point thereof) to determine if it desires to claim it. If the multipathing software module wants the path, the multipathing software module can claim and take ownership of it. However, if the multipathing software module does not want the path, the multipathing software module can reject it. If rejected, that path can be presented to the next multipathing software module until one of them actually claims it. In one embodiment, if the other multipathing software modules reject the path, the NMP multipathing software module can claim it. In one embodiment, the NMP multipathing software module can be implemented to always claim a path when it is presented with the path, but is not limited to such.

Note that, by having multiple multipathing software modules operating within a single operating system or the like (for example, VMKernel), the benefits of each multipathing software module can be realized by a single hardware system (e.g., computer, server, etc.) that is coupled to different physical storage media.

Thus, as described, in one embodiment, once the PSA knows the paths, it can present a path to each multipathing software module, in turn, and the multipathing software module has the option of claiming and taking ownership of it. In one such embodiment, the PSA gathers all physical paths to the same piece of storage media and then presents a physical logical device above itself. When a virtual machine issues an I/O (e.g., a read or write request) to its storage media, that I/O is converted into an I/O to a logical device, and the I/O is issued to that logical device. Next, the I/O (read or write request) is forwarded to the multipathing software module that is actually managing that logical device. Next, that multipathing software module selects which physical path it wants to issue the I/O to because, for example, not all of them may be working, or there may be higher priority or faster performance on one path. The multipathing software module selects the path and then issues the I/O, the PSA sends the I/O request out to the device driver, and finally out to the device. When the I/O is returned from the device, the PSA can then go back and post it as complete.

In one embodiment, the PSA prioritizes which multipathing software module is presented a path first and which multipathing software module will next be presented the path, and so on. For example, in one such embodiment, the PSA can prioritize the presentation of a path to the multipathing software modules based on the received vendor, model, and/or version string of the physical device. Note that, when the PSA issues a SCSI inquiry command to each path, a block of information is returned. In one embodiment, the three particular pieces of information of that block that the PSA is interested in can be the vendor (e.g., which is a text string), model (e.g., which is a text string), and/or version string (e.g., which is a number). As such, in one embodiment, the PSA can present a path to be claimed to the multipathing software module that corresponds to the vendor, model and/or version of the associated storage media or device. Specifically, if the vendor, model and/or version are for EMC, the PSA can go to the EMC multipathing software module first and ask if it wants to claim that path. For example, in one embodiment, if PowerPath 1 operates with version 1 and PowerPath 2 operates with version 2 and they are both operating simultaneously, based on the returned version associated with the path, the PSA can go to the corresponding version of PowerPath and ask if it wants to claim that path.

Figure 2:
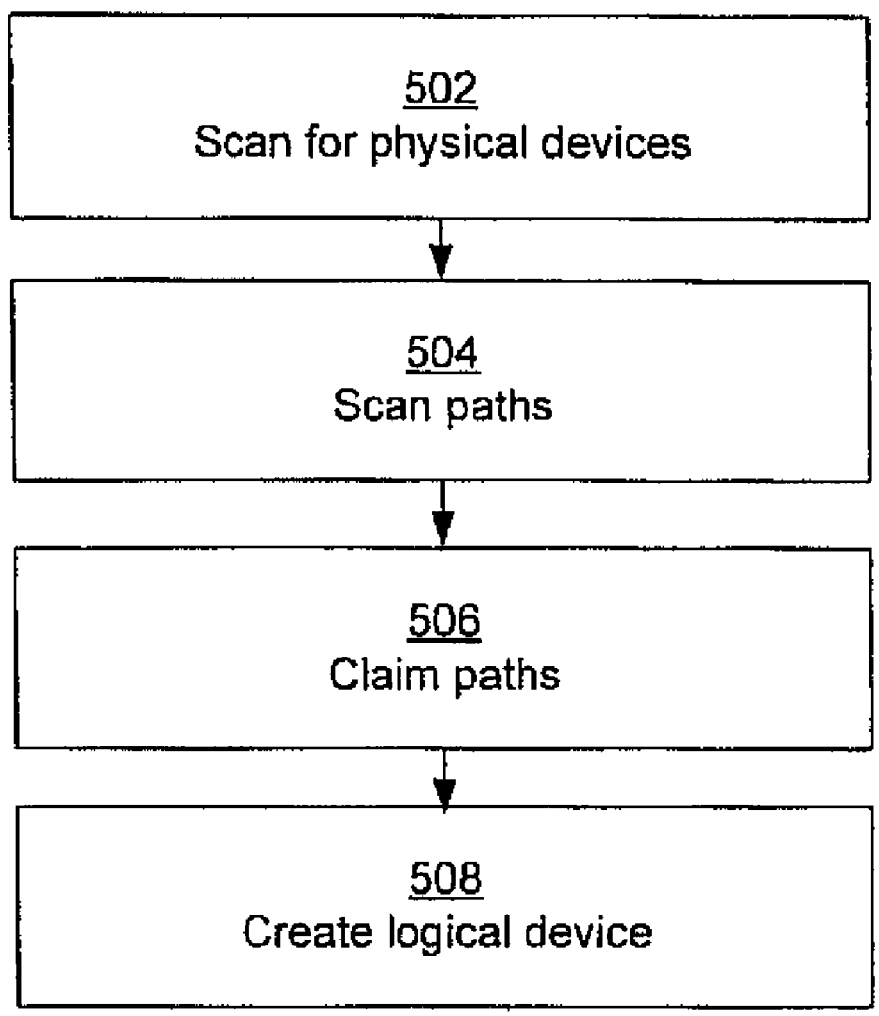
FIG. 2 is a flow diagram of an exemplary method in accordance with various embodiments of the invention.

FIG. 2 is a flow diagram of method 500 for enabling multiple multipathing software modules to operate within a single operating system in accordance with various embodiments of the invention. Flow diagram 500 includes processes that, in various embodiments, are carried out by a processor (s) under the control of computer-readable and computer-executable instructions (or code), e.g., software. The computer-readable and computer-executable instructions (or code) may reside, for example, in data storage features such as computer usable volatile memory, computer usable non-volatile memory, peripheral computer-readable media, and/or data storage unit. The computer-readable and computer-executable instructions (or code), which may reside on computer useable media, are used to control or operate in conjunction with, for example, processor and/or processors. However, the computing device readable and executable instructions (or code) may reside in any type of computing device readable medium. Although specific operations are disclosed in flow diagram 500, such operations are examples. Method 500 may not include all of the operations illustrated by FIG. 2. Also, embodiments are well suited to performing various other operations or variations of the operations recited in flow diagram 500. Likewise, the sequence of the operations of flow diagrams 500 can be modified. It is appreciated that not all of the operations in flow diagram 500 may be performed. It is noted that the operations of method 500 can be performed by software, by firmware, by electronic hardware, by electrical hardware, or by any combination thereof.

At step 502 of FIG. 2, a scan is performed for physical devices. Note that step 502 can be implemented in a wide variety of ways that are well known to those of ordinary skill in the art.

At step 504 of FIG. 2, paths are scanned to each of the physical devices. Note that step 504 can be implemented in a wide variety of ways that are well known to those of ordinary skill in the art.

At step 506 of FIG. 2, the paths are presented to one or more multipathing software modules and are claimed by one multipathing module in a wide variety of ways that are well known to those of ordinary skill in the art.

At step 508, one or more logical devices are created and exposed, wherein each logical device can be associated with a multipathing software module in a wide variety of ways that are well known to those of ordinary skill in the art. At the completion of step 508, method 500 is exited.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the claims and their equivalents.

What is claimed is:

1. A method for enabling a computer system to run multiple multipathing software modules comprising:
    discovering paths to storage devices, the paths being physical paths to specific ones of the storage devices;
    presenting one or more of the paths to multipathing software modules of a plurality of multipathing software modules operating within the computer system, wherein presenting one or more of the paths is in accordance with inquiry data and configuration rules, the configuration rules indicate multipathing software modules to which a path to a particular type of storage device is to be presented;
    the multipathing software modules claiming or rejecting one or more of the one or more paths, such that the claiming or rejecting by a multipathing software module claims or rejects all physical paths to a storage device; and
    the multipathing software modules presenting logical devices associated with the multipathing software modules for use by the computer system.

2. The method of claim 1, wherein presenting logical devices further comprises causing a computer system application program interface to export the logical devices.

3. The method of claim 1 wherein presenting the one or more of the paths includes preventing multiple multipathing software modules from sharing the same path.

4. The method of claim 1 wherein presenting one or more of the paths includes preventing multiple physical paths to the same logical from being shared among multiple multipathing software modules.

5. The method of claim 1 wherein multipathing software modules provided by a hardware vendor for a storage device manage physical paths to that hardware vendor's storage devices.

6. The method of claim 1 wherein presenting one or more of the paths comprises presenting each of the physical paths to one or more of the multipathing software modules.

7. The method of claim 6 wherein claiming or rejecting comprises the multipathing software modules having an option of claiming a path.

8. The method of claim 1 wherein presenting one or more of the paths comprises a path to each multipathing software module, in turn, and the multipathing software module having an option of claiming and taking ownership of the path.

9. The method of claim 1 wherein presenting one or more of the paths includes prioritizing which multipathing software module is presented a path first and which multipathing software module will next be presented the path.

10. The method of claim 9 wherein prioritizing comprises presenting a path to the multipathing software modules based on vendor, model, and/or version ostring of the physical device.

11. A method for enabling a computer system to run multiple multipathing software modules comprising:
    discovering paths to storage devices, the paths being physical paths to specific ones of the storage devices, wherein upon discovering a path, issuing an inquiry to the path, the inquiry returning information comprising vendor of the device, model of the device, and/or version of the device;
    presenting one or more of the paths to multipathing software modules of a plurality of multipathing software modules operating within the computer system, wherein presenting one or more of the paths is in accordance with inquiry data and configuration rules;
    the multipathing software modules claiming or rejecting one or more of the one or more paths, such that the claiming or rejecting by a multipathing software module claims or rejects all physical paths to a storage device; and
    the multipathing software modules presenting logical devices associated with the multipathing software modules for use by the computer system.

12. The method of claim 11, wherein presenting one or more of the paths comprises using the information to present a path to a particular multipathing software module, which particular multipathing software module is indicated in the configuration.

13. A method for enabling a computer system to run multiple multipathing software modules comprising:
    discovering paths to storage devices, the paths being physical paths to specific ones of the storage devices;
    presenting one or more of the paths to multipathing software modules of a plurality of multipathing software modules operating within the computer system, wherein presenting one or more of the paths further includes,
    presenting a path to one multipathing software module;
    the multipathing software module rejecting the path;
    presenting the path to another multipathing software module;
    the multipathing software modules claiming or rejecting one or more of the one or more paths, such that the claiming or rejecting by a multipathing software module claims or rejects all physical paths to a storage device; and
    the multipathing software modules presenting logical devices associated with the multipathing software modules for use by the computer system.

14. The method of claim 13 wherein at least one multipathing software module always claims a path.

* * * * *